(12) United States Patent
Clash et al.

(10) Patent No.: US 7,045,253 B2
(45) Date of Patent: May 16, 2006

(54) ZINC SHAPES FOR ANODES OF ELECTROCHEMICAL CELLS

(75) Inventors: David G. Clash, Fairview Park, OH (US); Robert N. Mansfield, Jr., Valley View, OH (US); Christopher F. Randell, Durham (GB); Nghia Cong Tang, Olmsted Falls, OH (US); Lewis F. Urry, Elyria, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/784,749

(22) Filed: Feb. 23, 2004

(65) Prior Publication Data

US 2004/0166413 A1 Aug. 26, 2004

Related U.S. Application Data

(63) Continuation of application No. 09/403,965, filed on Jan. 7, 2002, now abandoned.

(51) Int. Cl.
*H01M 4/42* (2006.01)

(52) U.S. Cl. .................................................. 429/229
(58) Field of Classification Search ................. 429/229
See application file for complete search history.

(56) References Cited

U.S. PATENT DOCUMENTS

| 4,606,869 A | 8/1986 | Showak ..................... 264/12 |
| 6,022,639 A | 2/2000 | Urry ......................... 429/229 |
| 6,284,410 B1 * | 9/2001 | Durkot et al. .............. 429/229 |
| 6,706,220 B1 | 3/2004 | Glaeser ....................... 252/512 |

FOREIGN PATENT DOCUMENTS

JP 07254406 A * 10/1995

* cited by examiner

*Primary Examiner*—Tracy Dove
(74) *Attorney, Agent, or Firm*—Russell H. Toye, Jr.

(57) ABSTRACT

An electrochemical cell 30 which contains both a cathode 32 and an anode 34. The anode contains a mixture of uniformly shaped particles 10 and electrolyte. The anode can also contain a zinc powder comprising non-uniform shaped, which can be mixed with the uniformly shaped particles of the present invention.

16 Claims, 5 Drawing Sheets

ZINC FLAKES

ZINC POWDER

Fig. 4

ZINC FLAKES

ZINC SHAPES FOR ANODES OF ELECTROCHEMICAL CELLS

This application is a continuation of prior application Ser. No. 09/403,965 filed Jan. 7, 2002 now abandoned. The contents of this application are incorporated by reference herein.

FIELD OF THE INVENTION

This invention relates to the use of uniformly shaped non-mercury-added zinc particles as the anode's active material in an electrochemical cell. This invention also relates to the use of uniformly shaped and uniformly sized non-mercury-added zinc particles as the anode's active material in an electrochemical cell.

BACKGROUND OF THE INVENTION

Aqueous alkaline manganese dioxide zinc batteries consume zinc metal particles during electrochemical discharge. Zinc particle electrodes have the advantage of high active surface area per gram of zinc which allows high average current densities without excessive polarization. The particles are made to contact a current collector. An aqueous electrolyte solution provides ionic conduction between the anode and the cathode. The aqueous electrolyte may also function as a reactant or provide reactants. The electrolyte solution is typically an aqueous alkaline electrolyte containing potassium hydroxide, sodium hydroxide, or a mixture thereof.

On discharge, the zinc particles produce electricity and a reaction product consisting of zinc hydroxides, zincate ions, or zinc oxides. Generally, conventional zinc particles have had irregular shapes. The elimination of mercury in the zinc anode of an electrochemical cell has resulted in poor electrical contact between the zinc particles and has led to an increase in corrosion. One method used to overcome poor electrical contact has been to use higher concentration of zinc in the anode. However, this reduces the space available for reaction products. Another method used to overcome poor electrical contact has involved concentrating the zinc by creating connected agglomerates of zinc. Patents and applications that describe the use of agglomerates include European Patent Application EP 414,990 A1; U.S. Pat. No. 4,963,447 to Nishimura et. al.; and U.S. Pat. No. 3,884,722 to Tucholski. Unfortunately, using the gelling agents described in these patents can impair the cell's discharge characteristics by inhibiting the reaction efficiency of the zinc.

Others in attempts to reduce anode gassing have compressed the zinc particles such as in Vu et al.; U.S. Pat. No. 4,743,185. Others have used zinc powders of a generally spherical shape such as in Japanese unexamined patent publication 4-296451. However, this publication teaches zinc apparent densities greater that 3.5 g/cc with anode zinc concentrations as high as 75 weight percent.

In order to achieve the highest electrochemical activity from the zinc particles with the highest particle-to-particle contact and electroconductivity, it is desirable to have an anode comprising zinc particles having uniform morphology and/or size. It would also be desirable to have zinc particles having the same porosity, chemical composition, reactivity, morphological, topological, and physical properties. Battery systems in which zinc particles of this invention may be used include alkaline manganese dioxide-zinc cells, zinc-air button cells, and the like, including primary and secondary batteries.

SUMMARY OF THE INVENTION

This invention is an electrochemical cell comprising a cathode, an aqueous alkaline electrolyte, and a non-mercury-added anode comprising uniformly shaped zinc particles.

In another aspect, this invention is an electrochemical cell comprising a cathode, an aqueous alkaline electrolyte, and a non-mercury-added anode comprising uniformly shaped zinc particles having uniform size.

The electrochemical cell of the present invention includes the uniformly shaped zinc particles having a tap density less than 2.5 g/cc, preferably having a tap density less than 2.0 g/cc, very preferably having a tap density less than 1.5 g/cc, and most preferably having a tap density less than 1.3 g/cc.

In the electrochemical cell of the present invention the uniformly shaped zinc particles comprise fifty percent or less of the zinc in the anode, preferably the uniformly shaped zinc particles comprise twenty percent or less of the zinc in the anode, very preferably the uniformly shaped zinc particles comprise fifteen percent or less of the zinc in the anode, and most preferably the uniformly shaped zinc particles comprise ten percent or less of the zinc in the anode.

In the electrochemical cell of the present invention containing the uniformly shaped zinc particles the zinc weight concentration of the anode is less than 70 percent, preferably the zinc weight concentration of the anode is less than 68 percent, very preferably the zinc weight concentration of the anode is less than 66 percent, most preferably the zinc weight concentration of the anode is less than 64 percent or below 62 percent.

In a preferred embodiment of the electrochemical cell of the present invention the uniformly shaped particles have the length, width and thickness dimensions in the range of 0.06, 0.06 and 0.0025 to 0.01, 0.01 and 0.0004 inches, most preferably the length, width and thickness dimensions are in the range of 0.04, 0.025 and 0.0008 inches to 0.02, 0.025, and 0.0008 inches.

In a preferred embodiment of the invention the zinc weight concentration of the anode is less than 67 percent, the uniformly shaped zinc particles comprise twenty percent or less of the zinc in the anode, and the uniformly shaped zinc particles having a tap density less than 2.5 g/cc.

DETAILED DESCRIPTION OF THE INVENTION

Generally, the present-invention is an electrochemical cell comprising the novel use of a non-mercury-added anode comprising uniformly shaped zinc particles. According to this invention, the use of zinc particles having a uniform morphology increases the performance of the zinc anode in an electrochemical cell.

The inventors have found that the use of uniformly shaped zinc particles can have one or more of the following advantages. First, the surface area/volume ratio can be increased. Second, the current carrying matrix of zinc particles is easier to maintain. Third, the zinc particles' high current discharge efficiency can be improved. Fourth, the anode's sensitivity to shock and vibration can be reduced or eliminated. Fifth, the quantity of zinc packing needed can be minimized. Sixth, conductivity within the anode is improved. Seventh, processability, flowability, and dispensability of the anode is improved. Eighth, the use of large particle gelling agents can be eliminated. Ninth, the quantity of gelling agent used in the anode can be reduced. Tenth, the zinc-to-electrolyte ratio is improved. Eleventh, zinc-to-zinc contact is improved. Twelfth, the distribution of zinc in the gelled electrolyte is improved.

The expression "uniform shape" or "uniformly shaped" is intended to mean individual particles having substantially consistent morphology. This definition is contrasted against the prior art zinc powders with consistently irregularly shapes, few of which are similar to each other. To have a uniform shape as described and claimed, each of the particles shape factor must be substantially similar to all other particles. Therefore for example, if the uniform shape is flakes, then all of the particles must be flakes. In order to produce uniformly shaped particles, control of the forming or classification process should be used to ensure this required consistent particle shape.

The shapes of zinc particles can be determined by examining the particles with a scanning electron microscope. Preferably, the zinc particles of this invention will also have substantially consistent surface finishes and porosity characteristics.

As found in this invention, the shape of zinc particles is critical to electrochemical activity and anode processing. The size can also be critical to electrochemical activity and anode processing. When the particles are irregularly shaped or too large, processability of the anode is difficult. However, when the particles are too small, there can be increased ionic and electrical resistance.

More preferably, the zinc particles of this invention will have a uniform morphology and a uniform size. The use of uniformly shaped zinc particles with uniform size has the advantages of providing uniform bulk density and consistent particle-to-particle contact. The shape and size of the zinc particle can be optimized depending on the application. For uniformly shaped spherical zinc particles provide enhanced processability of the anode. Zinc particles having a "dogbone" morphology provide an advantage when used in continuous drain applications. However, as the particle size gets larger, flowability of the anode may decrease. Also, although the large particles provide relatively larger areas of contact, the smaller particles are preferred due to enhanced zinc-to-zinc contact and improved flowability.

The zinc particles of this invention can also have substantially similar porosity characteristics. By "porosity" is meant a particle having intraparticle void volume greater than zero. A porous zinc particle can also comprise interconnected pores. The total porosity of the zinc is preferably greater than 25 percent porosity and, more preferably, greater than 50 percent porosity as determined by bulk or tap density analyses. An advantage to having a highly porous zinc electrode is the ability to store electrolyte in the pores of the electrode and then use this electrolyte to replenish the water and hydroxyl ions which are consumed during discharge of the cell. Porous zinc particles provide a high surface area-to-volume ratio which is important in high drain rate applications. Particle morphologies having intraparticle void volume can be shaped as a sponge, honeycombs foam, tube, and the like.

The zinc particles of this invention can also be solid zinc particles with no internal void volume. Particle morphologies having no intraparticle void volume can be shaped as a flake, snake, filament, donut, sphere, dogbone, biscuit, or dendrite. These particles may be corrugated. Suitable morphologies include tentacle-like, helix, or faceted. Flakes can have the shapes of discs, ribbons, clamshells, triangles, squares, troughs, rhomboids, rectangles, boomerangs, and the like. "Snake" morphology can have the shapes of rods, cylinders, carrots, needles, worms, or bananas. In general, "snake" morphology would include those shapes having an approximately round cross-section, not necessarily uniform along its length, where the ratio of length to average diameter is greater than 1 and wherein the axis is defined as a line connecting a locus of points through the centers of all cross-sections. This axis of round cross-section is not necessarily straight. Filament morphology resembles wire, hair, thread, spaghetti, fibrils, fiber, ribbon, or turnings. The zinc particles can also have "donut" or torus morphology. The zinc particles can also have spheroid morphology, such as spheres, tadpoles, teardrops, pears, or squash-like shapes. Zinc particles having "dog bone" morphology can best be described as those particles having an approximately round cross-section, not necessarily uniform along its length, where the ratio of length to average diameter is greater than 1, the axis is not necessarily straight, and the diameters of both ends are greater than the average diameter along the axis. A biscuit morphology is described as a briquette, flattened sphere, or cookie-like morphology. A dendrite morphology resembles feathers or snowflakes. A corrugated morphology resembles waffles, or mesh screens. A tentacle morphology resembles plant roots, octopus, or squid. A helix morphology resembles springs, scrolls, or turnings. A faceted morphology resembles pyramid or multifaceted objects.

Surface finishes that are suitable for use with particles of this invention include: smooth, mossy, porous, grooved, dendritic and waffle-like.

The uniformly shaped zinc particles of this invention can be formed in a variety of ways. For example, U.S. Pat. No. 4,154,284 describes a process of producing flake particles having a small length-to-width or small length-to-thickness ratio by extraction from a molten pool or unconfined drop. The process utilizes a rotatable heat-extracting member having a serrated circular peripheral edge with each serration having a leading surface angularly shaped to contact the surface of the molten material. This process is capable of controlling the shape, size, and thickness of the final flake product. Furthermore, the flakes will be "substantially uniformly shaped." The precise shape and dimensions of the individual flake particles can be controlled by changing one or more of the following process parameters: the angle at which the serrated edge contacts the molten material; the height of the serration, the length of the serration, the diameter of the rotating member; the rate at which the molten flake is cooled; the atmosphere (air vs. vacuum); etc.

A process suitable for making particles having "snake" like morphology (as described above) is disclosed in U.S. Pat. No. 3,871,439. This patent discloses a method of making fine filamentary material directly from molten material by rotating the peripheral edge of a machine threaded cylindrical heat-exchanging member in contact with the surface of the molten material. Small fibers (i.e., less than 100 microns in length) are readily produced by this process. The length of the fibers can be controlled by incorporating indentations on the extremities of the projections that define the surface of the cylindrical heat-exchanging member.

A process for manufacturing "uniform particulate" is disclosed in U.S. Pat. No. 4,385,013. This process produces particulate directly from a supply of molten material by the use of a rotating member having discrete serrations in the periphery thereof. The leading surfaces of the serration contact the molten material and propel a portion into a cavity formed by the surfaces of the serration while under the effect of a surface of a dam means, in proximity to which the serrations pass. The dam means is immersed in the supply of molten material adjacent to the periphery of the rotating member. Provided that each of the serrations on the rotating member is identical, the particulate produced will be uniform in shape and size. By changing the shape of the serrations, the shape of the particulate can be altered to any one of a wide variety of shapes. By way of example, three of the shapes disclosed include: quadrahedron, a five-sided triangular particle, and a six-sided particle.

The zinc particles of this invention can be purchased from known zinc manufacturers such as Transmet Corporation of Columbus, Ohio, U.S.A. or Eckart-PM-Laboratory of Vetroz, Switzerland.

EXAMPLES

Two different zinc shapes were added to a conventional zinc powder composition in different amount using a total zinc weight percent of the anode in the range of 62–64%. A control was used with 100 wt. % conventional zinc powder and a total zinc weight percent of the anode in the range of 69–71%.

Each of the experimental cells were manufactured so that the cathode theoretical Ampere hour value and anode theoretical Ampere hour value were kept constant regardless of the total zinc content. This was accomplished by using a larger cathode ID for the 62–64 weight percent total content anodes.

The experiments were done in three parts:
1. Shock testing—The short circuit amperage (SCA) of the cell was taken before and after drop testing (procedure defined below).
2. Performance testing—1A continuous, 1A Photoflash, and 3R9 Continuous.
3. Impedance testing—the impedance of the anodes were measured on an Autolab PGSTAT20 using FRA software from EchChemie.

Example 1

The tap density of all zinc samples were first measured according to the following procedure:
1. Zinc is put in a pre-weighed 25 ml measuring cylinder.
2. The zinc is then tapped on a rubber bung whereby the level of the zinc falls.
3. Extra zinc is added in stages until the zinc level is exactly 25 ml in the measuring cylinder.
4. The measuring cylinder is weighed again.
5. The weight of zinc which occupies 25 ml can then be calculated.
6. The Tap density is the weight of zinc which occupies 25 ml/25 ml The results were calculated and are tabulated in Table 1.

TABLE 1

| Zinc type | Tap Density (g/cc) |
| --- | --- |
| Needles | 3.6 |
| Conventional powder | 3.4 |
| Flakes | 1.3 |

Example 2

Numerous groups of cells were manufactured with two different cell formulations.

| Formulation 1 | |
| --- | --- |
| Cathode Ah = | 2.7 |
| EMD:C = | 12:1 |
| ID (mm) = | 8.73 |
| Anode Ah = | 3.3 |
| Zinc Content = | 69% |
| $H_2O$/EMD = | 0.24 |

| Formulation 2 | |
| --- | --- |
| Cathode Ah = | 2.7 |
| EMD:C = | 17:1 |
| ID (mm) = | 9.00 |
| Anode Ah = | 3.3 |
| Zinc Content = | 63 |
| $H_2O$/EMD = | 0.24 |

| Common Features | |
| --- | --- |
| EMD | GHU by TOSOH |
| Graphite | Superior Graphite |
| KOH Conc. | 35% |
| Can Coating | LB1099 by Timcal |

| Zinc Types | Alloys | Designation | Supplier |
| --- | --- | --- | --- |
| Zinc Powder | BIC | Powder | Big River Zinc |
| Zinc Flake | BIC | K308 | Transmet of Ohio |
| Zinc Flake | NOT BIC | K109 | Transmet of Ohio |
| Zinc Needles | BIC | Doralloy 107 GN | Eckart-Doral of Switzerland |

Example 3

The cells were tested according to the following drop test method. The results of the testing are compiled in Table 2, and presented graphically in FIG. 7.
1. The SCA (Flash Amps) of the cell is measured 1 week after manufacture.
2. The cell is allowed to fall down a vertical shaft. The length of the shaft is 1 m. To start the drop the cell is rolled so that it always falls on its side rather than the ends.
3. The SCA (Flash Amps) of the cell is measured immediately after being rolled down the vertical shaft.

TABLE 2

| Anode comp. | Amperage before drop | Amperage after drop | Amperage maintenance (%) |
| --- | --- | --- | --- |
| 100/0/70 | 16 | 4 | 25 |
| 100/0/63 | 7 | 0 | 0 |
| 95/5/63 | 18 | 5 | 28 |
| 90/10/63 | 19 | 9 | 47 |
| 85/15/63 | 21 | 9 | 43 |

Table 2 shows the results of the drop test for various anode concentrations. The concentrations should be interpreted as (% of zinc powder/% of zinc flake/anode zinc weight percent). Amperage maintenance is amperage after drop divided by amperage before drop.

Figure 7:
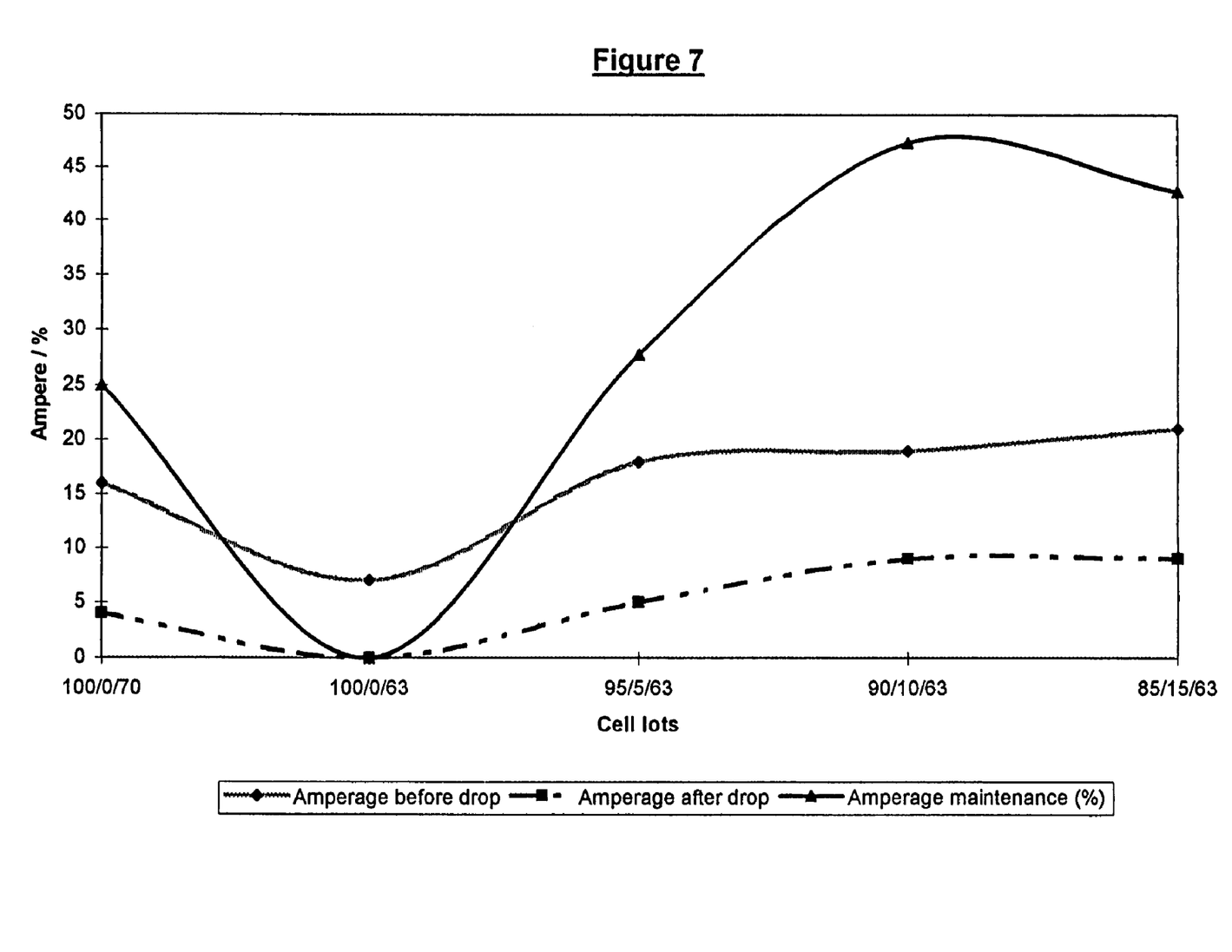
FIG. 7 is a graph showing the results of a drop test described in the examples specifically in relation with Table 2.

Referring now to FIG. 7, there is shown a graphical representation of the results presented in Table 2. Both Table 2 and this figure show the superior amperage maintenance results acheived in low zinc anode concentrations by the addition of uniform shaped zinc to the anode.

Example 4

Figure 8:
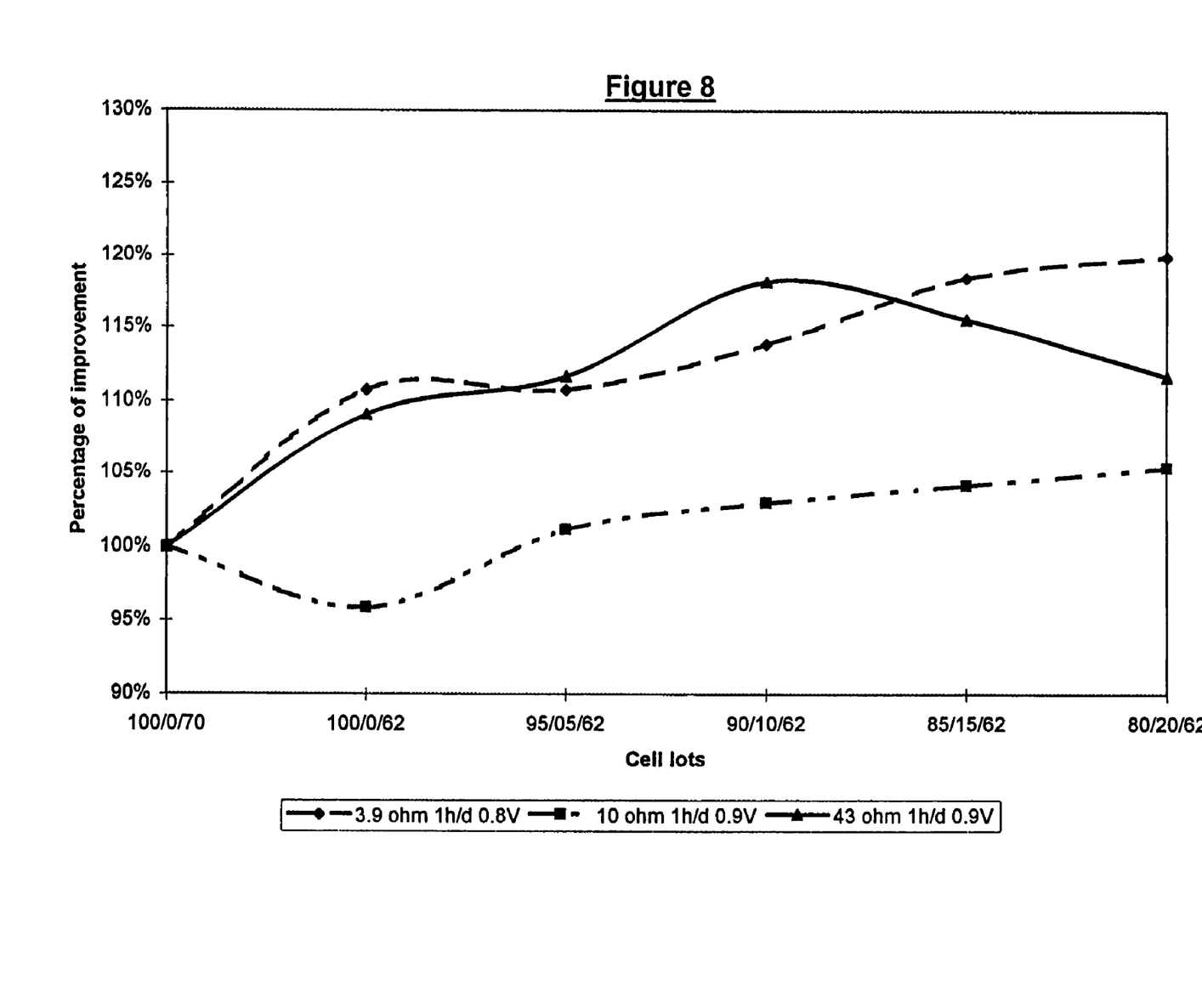
FIG. 8 is a graph showing the results of cell testing as described in the examples.

The cells formed in example 2 were tested according to standard industry duration tests. The results of the tests are presented both in Table 3 and in FIG. 8. The results clearly show the advantages supplied to batteries using the present invention.

TABLE 3

|  | Relative to 100/0/70 | | | Test Data | | |
| --- | --- | --- | --- | --- | --- | --- |
|  | 3.9 ohm 1 h/d 0.8 V | 10 ohm 1 h/d 0.9 V | 43 ohm 1 h/d 0.9 V | 3.9 ohm 1 h/d 0.8 V | 10 ohm 1 h/d 0.9 V | 43 ohm 1 h/d 0.9 V |
| 100/0/70 | 100% | 100% | 100% | 6.5 | 16.9 | 77 |
| 100/0/62 | 111% | 96% | 109% | 7.2 | 16.2 | 84 |
| 95/05/62 | 111% | 101% | 112% | 7.2 | 17.1 | 86 |
| 90/10/62 | 114% | 103% | 118% | 7.4 | 17.4 | 91 |
| 85/15/62 | 118% | 104% | 116% | 7.7 | 17.6 | 89 |
| 80/20/62 | 120% | 105% | 112% | 7.8 | 17.8 | 86 |

Example 5

In this example cells constructed in example 2 were subjected to impedence testing. This method of testing is know in the art and was conducted using an Autolab PGSTAT20 using FRA software from EchChemie. The reslts are shown in Table 4 below.

TABLE 4

| Total Zinc Content | KOH % | Flake | 10 KHz | | 1 KHz | | 100 Hz | | 10 Hz | | 1 Hz | | 0.1 Hz | | 0.01 Hz | |
| --- | --- | --- | --- | --- | --- | --- | --- | --- | --- | --- | --- | --- | --- | --- | --- | --- |
|  |  |  | z' | z" | z' | z" | z' | z" | z' | z" | z' | z" | z' | z" | z' | z" |
| 70.5% | 35% | 0% | 0.3 | −0.1 | 0.3 | 0.1 | 0.4 | 0.8 | 3.2 | 5.8 | 15 | 5 | 18 | 2 | 19 | 2 |
| 63.5% | 35% | 0% | 0.8 | 0.5 | 1.7 | 2.5 | 3.9 | 28 | 105 | 173 | 391 | 132 | 487 | 65 | 501 | 50 |
| 63.5% | 35% | 5% | 0.3 | 0 | 0.3 | 0.1 | 0.4 | 0.7 | 2.2 | 5.6 | 17 | 8 | 22 | 3 | 22 | 2 |
| 63.5% | 35% | 10% | 0.2 | −0.1 | 0.3 | 0 | 0.3 | 0.4 | 1.7 | 3 | 8 | 3 | 10 | 1 | 11 | 1 |
| 63.5% | 35% | 15% | 0.2 | −0.1 | 0.2 | 0 | 0.3 | 0.4 | 1.4 | 2.9 | 9 | 3 | 10 | 1 | 11 | 1 |

In the Table, z' is the real impedance, and z" is the imaginary impedance. The results show that as the total zinc content of the anode is decreased the impedance dramatically increases. This is indicative that the cell would be inoperative when the total zinc content is dropped much below 70 weight percent.

However when the uniform shapes are added to the anode the total zinc concentration of the anode can be decreased. An optimal level of flake appears at 10%.

It is well known that if the total zinc content of a 0 Hg zinc anode falls below 67% the resistance to shock deteriorates. This has been demonstrated in example 3. After 1 m drop testing 62–64% total zinc content paste containing ONLY normal zinc shows 0 A SCA. It is possible to recover the shock resistance of 62–64% total zinc content paste by adding zinc flake. However the addition of zinc needles does not produce desirable results.

For flakes, as the flake content is increased the usability of the anode gel decreases. The best compromise between shock resistance and usability is ~10% zinc flake content. However this optimal point is dependant upon the type of uniformly shaped particle and will differ with different geometries.

At 10% flake content for 62–64% total zinc content gel performance reaches an overall maximum for all performance tests (from very high rate to very low rate). A typical very high rate test is 1A/Cont./1V0.A typical very low rate test is 43R0/4 h/0V9. However the incorporation of Dorally 07CN needles though has no beneficial effect on 62–64% total zinc content pastes.

The main difference between the flakes and the needles is the tap density. The tap density of the zincs used in this study are given above in Table 1. The flake has a very low tap density. And it is believed that this is the key to why the flakes work with 62-64% total zinc content gel but the needles do not. The low density flakes make a matrix through the anode gel which gives resistance to shock. Also very high rate 1A performance is boosted. The needles are too high a density to make the required matrix, so shock resistance & 1A performance suffer.

So the advantage of low tap density zinc is that it allows a matrix to be formed in low total zinc content anode gel. This matrix gives good shock resistance.

Adding low tap density zinc allows low total zinc content to be used in alkaline manganese. As the Hg level was reduced in alkaline manganese zinc anodes the total zinc content of the anode paste has been raised. Typically in the days of 6% Hg the total zinc content of AA anode paste was as low as 64.75%. With cells used today with conventional 0% Hg zinc powders, the typical total zinc content is 70%.

Attempts of local densification have been made by adding nuggets. The use of low tap density zinc allows total zinc contents of 62–64% to be used with 0% Hg. The extra electrolyte bound in such a gel leads to improved efficiency. This in turn leads to improved performance.

DETAILED DESCRIPTION OF THE DRAWINGS

Figure 1:
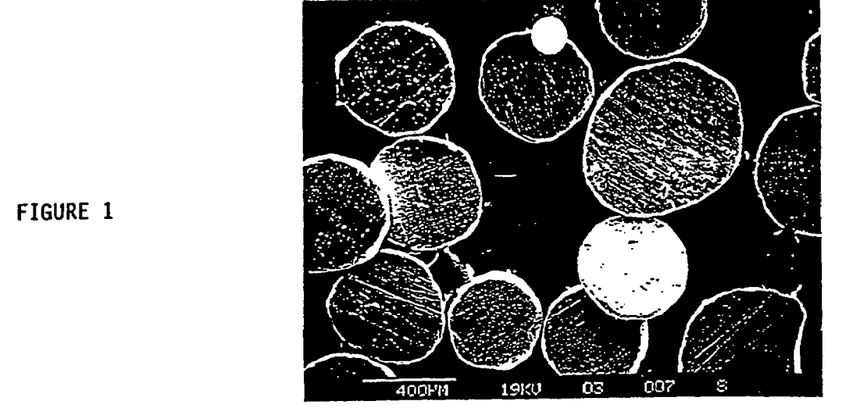
FIG. 1 is a scanning electron micrograph of zinc particles having a uniform biscuit shape of the present invention.
Figure 2:
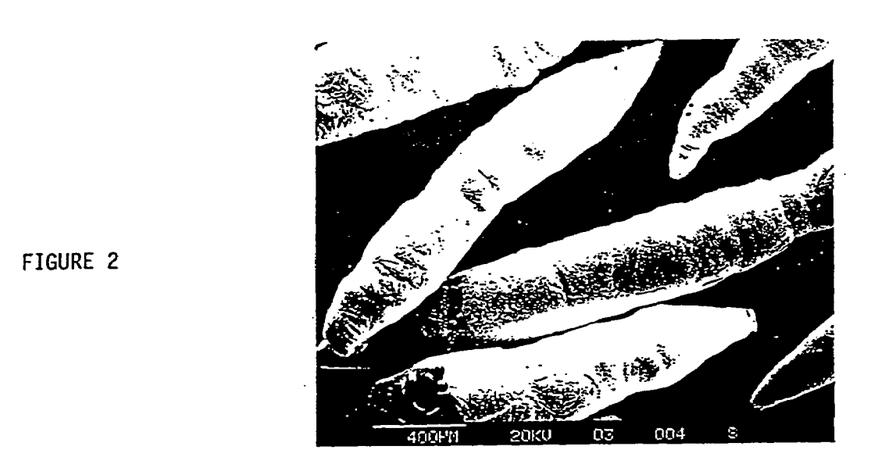
FIG. 2 is a scanning electron micrograph of zinc particles having a uniform needle shape of the present invention.
Figure 3:
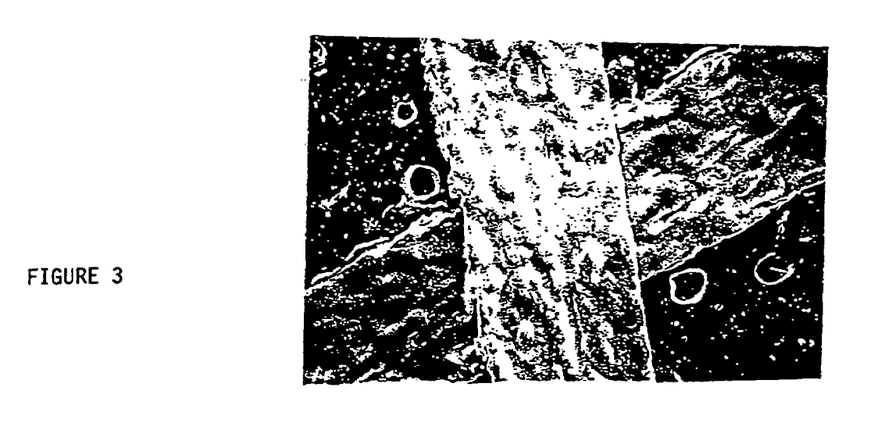
FIG. 3 is a scanning electron micrograph of zinc particles having a uniform ribbon shape of the present invention.
Figure 4:
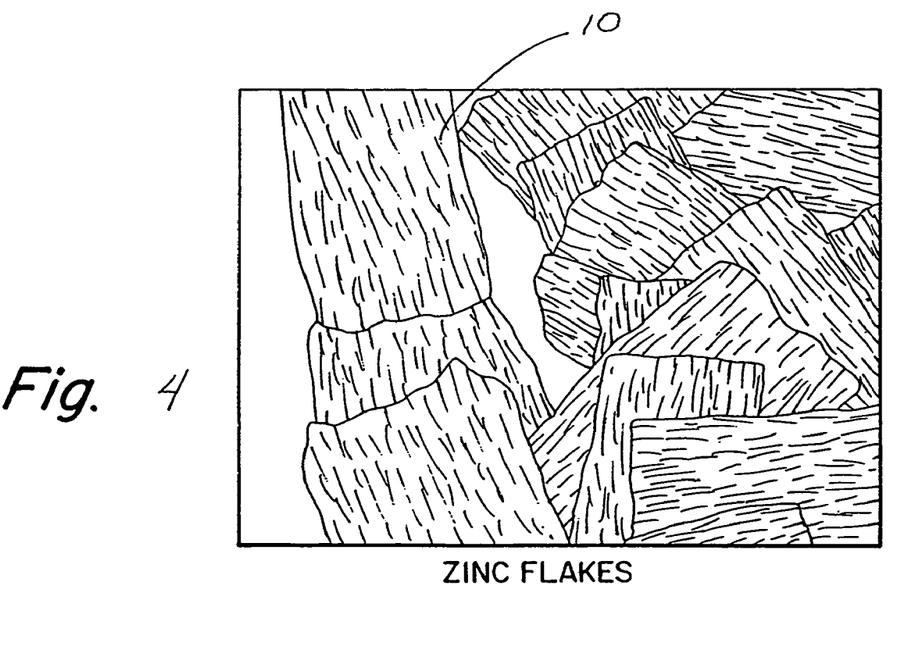
FIG. 4 is a representative drawing of a scanning electron micrograph of zinc particles having a uniform flake shape of the present invention.
Figure 5:
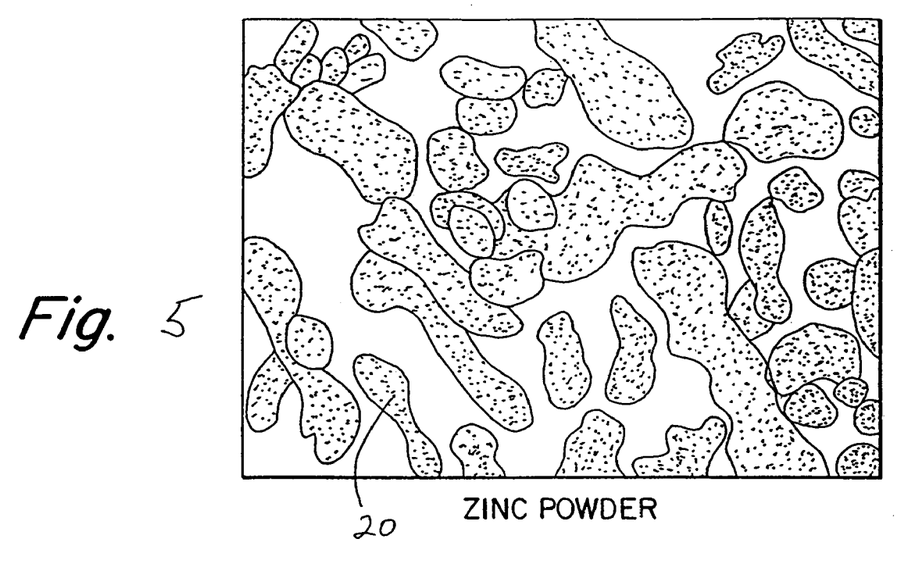
FIG. 5 is a representative drawing of a scanning electron micrograph of zinc particles having a non-uniform shape. This type of zinc particle is typical of the prior art and is normally referred to as zinc powder.

Referring now to the drawings and specifically to FIG. 4, there is show a uniformly shaped zinc particle 10 of the present invention. Each of the other particles are substantially the same size and geometry as the particle 10. Contrast this with the prior art zinc particle 20 shown in FIG. 5, which is dissimilar relative to the other particles in the figure.

Figure 6:
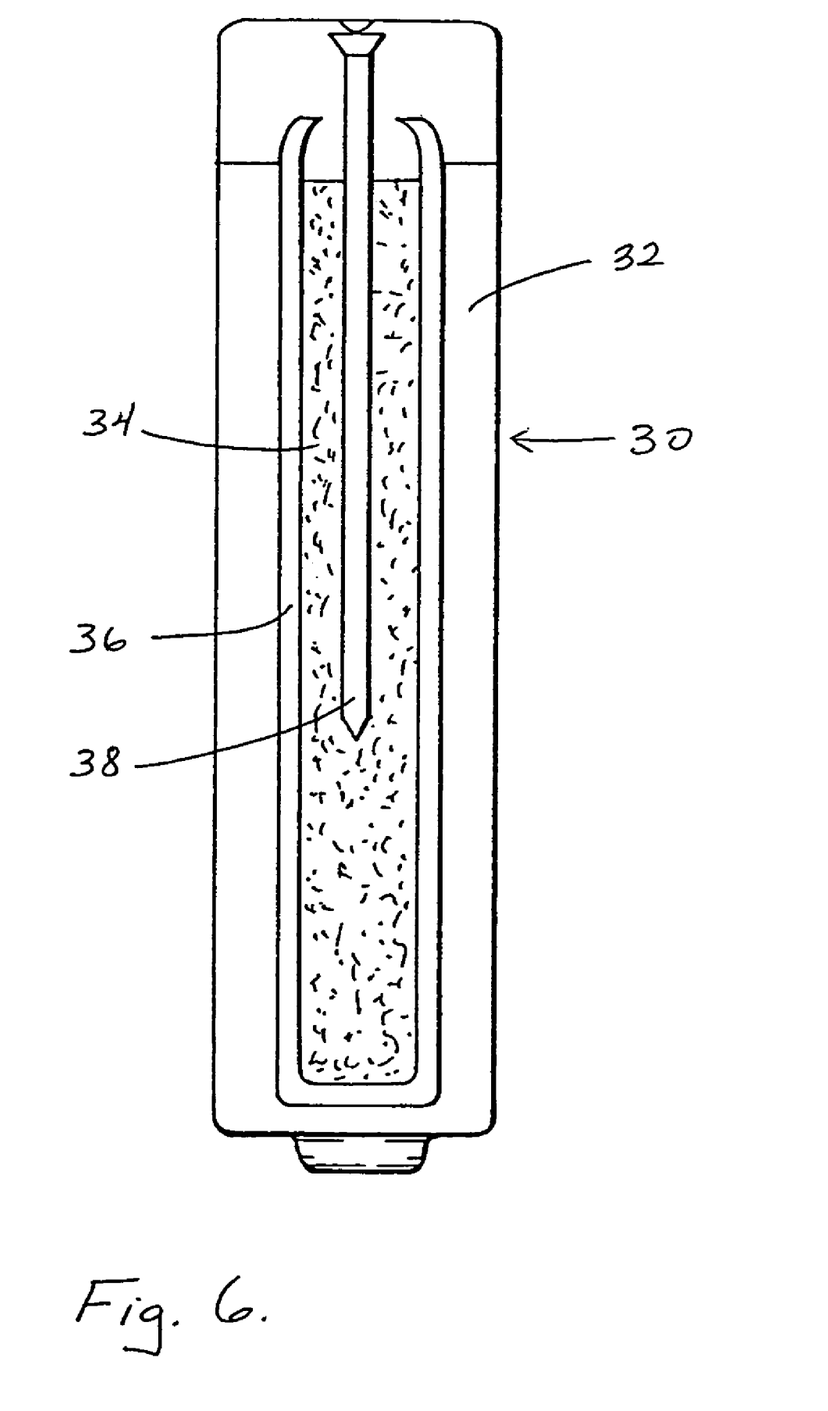
FIG. 6 is a cross-sectional view of an electrochemical cell of the present invention.

Referring now to FIG. 6, there is shown an electrochemical cell 30 of the present invention. The cell 30 contains both a cathode 32 and an anode 34. The anode contains a mixture of uniformly shaped particles and electrolyte. The electrolyte is preferably potassium hydroxide, however other alkaline or nonalkaline electrolyte are suitable alternatives. The anode can also contain a gelling substance, several of which are well known in the art. The anode can also contain a zinc powder comprising non-uniform shaped, which can be mixed with the uniformly shaped particles of the present invention.

The cell 30 also includes a separator 36 which electrically insulates the anode from the cathode, while allowing for ionic diffusion there through. The cell 30 also contains a current collector 38 which acts to collect the electrons from the anode 344 and transport them to a external apparatus so that work can be performed.

What is claimed is:

1. An electrochemical cell comprising a non-mercury added zinc anode comprising uniformly shaped zinc particles having smooth surface finishes.

2. The electrochemical cell defined in claim 1 wherein said zinc particles comprise consistent porosity characteristics.

3. The electrochemical cell defined in claim 2 wherein said porosity is greater than 25 percent.

4. The electrochemical cell defined in claim 3 wherein said porosity is greater than 50 percent.

5. The electrochemical cell defined in claim 1 wherein said uniformly shaped zinc particles have a morphology selected from the group consisting of filament, donut, biscuit, tentacle, snake, corrugated, helix, dog bone, sponge, honeycomb, and foam.

6. The electrochemical cell defined in claim 1 wherein said uniformly shaped zinc particles have a tap density less than 2.5 g/cc.

7. The electrochemical cell defined in claim 1 wherein said uniformly shaped zinc particles have a tap density less than 2.0 g/cc.

8. The electrochemical cell defined in claim 1 wherein said uniformly shaped zinc particles have a tap density less than 1.5 g/cc.

9. The electrochemical cell defined in claim 1 wherein said uniformly shaped zinc particles have a tap density less than 1.3 g/cc.

10. The electrochemical cell defined in claim 1 wherein said anode has a zinc weight concentration less than 70 percent.

11. The electrochemical cell defined in claim 1 wherein said anode has a zinc weight concentration less than 68 percent.

12. The electrochemical cell defined in claim 1 wherein said anode has a zinc weight concentration less than 66 percent.

13. The electrochemical cell defined in claim 1 wherein said anode has a zinc weight concentration less than 64 percent.

14. The electrochemical cell defined in claim 1 wherein said anode has a zinc weight concentration less than 62 percent.

15. An electrochemical cell comprising a non-mercury added zinc anode comprising uniformly shaped zinc particles having consistent surface finishes and consistent porosity characteristics wherein said porosity is greater than 25 percent.

16. The electrochemical cell defined in claim 15 wherein said porosity is greater than 50 percent.

* * * * *